US009633659B1

(12) United States Patent
Agrawal et al.

(10) Patent No.: US 9,633,659 B1
(45) Date of Patent: Apr. 25, 2017

(54) METHOD AND APPARATUS FOR VOICE ENROLLING AN ELECTRONIC COMPUTING DEVICE (71) Applicant: Motorola Mobility LLC, Chicago, IL (US)

(72) Inventors: Amit Kumar Agrawal, Bangalore (IN); Himanshu Chug, Bangalore (IN); Satyabrata Rout, Karnataka (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/001,315

(22) Filed: Jan. 20, 2016

(51) Int. Cl.
*G10L 15/30* (2013.01)
*G10L 17/24* (2013.01)
*H04M 1/27* (2006.01)
*H04M 1/725* (2006.01)
*G10L 17/04* (2013.01)
*G10L 19/16* (2013.01)

(52) U.S. Cl.
CPC .............. *G10L 15/30* (2013.01); *G10L 17/04* (2013.01); *G10L 17/24* (2013.01); *G10L 19/173* (2013.01); *H04M 1/271* (2013.01); *H04M 1/72519* (2013.01)

(58) Field of Classification Search
CPC ....... G10L 15/30; G10L 19/173; G10L 17/24; G10L 17/04; H04M 1/271; H04M 1/72519
See application file for complete search history.

(56) References Cited

U.S. PATENT DOCUMENTS

| 5,608,784 A * | 3/1997 | Miller ..................... G06F 21/32 379/142.15 |
| 7,562,385 B2 * | 7/2009 | Thione .................... G06F 21/32 726/9 |
| 7,801,730 B1 * | 9/2010 | Miyazaki .......... H04L 12/40117 704/275 |
| 8,630,855 B2 * | 1/2014 | Oddo ................ H04L 29/12594 704/251 |
| 8,731,925 B2 * | 5/2014 | Da Palma ............... G10L 15/06 704/246 |
| 9,215,314 B2 * | 12/2015 | Nagatomo ........ H04M 3/42042 |
| 9,317,111 B2 * | 4/2016 | Levien |
| 9,349,112 B2 * | 5/2016 | Gazdzinski ............ G06Q 10/08 |
| 9,396,450 B2 * | 7/2016 | Gazdzinski ............ G06Q 10/08 |
| 9,462,134 B2 * | 10/2016 | Arslan .................... G06F 21/42 |
| 2003/0037004 A1 * | 2/2003 | Buffum ................... G06F 21/32 705/51 |
| 2003/0210770 A1 * | 11/2003 | Krejcarek ................ H04B 3/54 379/88.17 |
| 2004/0010724 A1 * | 1/2004 | Brown .................... G06F 21/32 713/186 |
| 2004/0019570 A1 * | 1/2004 | Bolle ...................... G06F 21/32 705/64 |

(Continued)

Primary Examiner — Fariba Sirjani (57) ABSTRACT

A method and apparatus for voice enrolling an electronic computing device includes a networked server configured to receive voice data over a first communication connection from a first electronic computing device, wherein the voice data comprises a user-specific launch phrase spoken by a user. The networked server is further configured to receive an indication of a second electronic computing device to voice enroll and to initiate voice enrollment of the second electronic computing device over a second communication connection using the voice data.

20 Claims, 5 Drawing Sheets (56) References Cited

U.S. PATENT DOCUMENTS

| | | | |
|---|---|---|---|
| 2005/0138391 A1* | 6/2005 | Mandalia | H04L 63/0861 713/186 |
| 2005/0251393 A1* | 11/2005 | Georgescu | G06F 17/30899 704/270.1 |
| 2006/0173791 A1* | 8/2006 | Mann | G06Q 20/04 705/74 |
| 2007/0036298 A1* | 2/2007 | Jain | H04M 3/42238 379/88.19 |
| 2007/0106517 A1* | 5/2007 | Cluff | G10L 17/10 704/273 |
| 2007/0143833 A1* | 6/2007 | Conley | G06F 21/32 726/5 |
| 2007/0155366 A1* | 7/2007 | Manohar | H04M 1/2535 455/411 |
| 2007/0198436 A1* | 8/2007 | Weiss | G06F 21/32 705/75 |
| 2007/0201443 A1* | 8/2007 | Saha | H04L 12/66 370/356 |
| 2007/0233483 A1* | 10/2007 | Kuppuswamy | G10L 17/20 704/247 |
| 2007/0250716 A1* | 10/2007 | Brunk | G06F 21/10 713/176 |
| 2008/0046250 A1* | 2/2008 | Agapi | G10L 15/075 704/275 |
| 2008/0046969 A1* | 2/2008 | Reiher | H04L 12/66 726/2 |
| 2008/0172230 A1* | 7/2008 | Hayakawa | G10L 17/14 704/249 |
| 2008/0195396 A1* | 8/2008 | Greene | G11B 19/02 704/275 |
| 2008/0217400 A1* | 9/2008 | Portano | G06Q 20/403 235/380 |
| 2009/0025071 A1* | 1/2009 | Mumm | G06F 21/32 726/7 |
| 2009/0163272 A1* | 6/2009 | Baker | A63F 13/12 463/29 |
| 2009/0210233 A1* | 8/2009 | Thompson, III | G06F 17/30654 704/275 |
| 2009/0259848 A1* | 10/2009 | Williams | H04L 63/0838 713/168 |
| 2010/0064350 A1* | 3/2010 | Dondeti | H04L 63/102 726/4 |
| 2010/0091762 A1* | 4/2010 | Roberts | H04L 65/1073 370/352 |
| 2011/0047605 A1* | 2/2011 | Sontag | G06F 21/32 726/7 |
| 2011/0054900 A1* | 3/2011 | Phillips | G10L 15/30 704/235 |
| 2011/0102142 A1* | 5/2011 | Widger | G09B 5/06 340/5.83 |
| 2011/0158226 A1* | 6/2011 | Kouchri | H04L 65/1076 370/352 |
| 2011/0225090 A1* | 9/2011 | Hammad | G06Q 20/40 705/44 |
| 2011/0275367 A1* | 11/2011 | Citron | H04W 60/005 455/432.1 |
| 2012/0254989 A1* | 10/2012 | Levien | G06F 3/011 726/19 |
| 2012/0295575 A1* | 11/2012 | Nam | G08B 25/016 455/404.1 |
| 2013/0006784 A1* | 1/2013 | Krauss | H04L 9/3231 705/18 |
| 2013/0033562 A1* | 2/2013 | Naidu | H04L 12/2809 348/14.02 |
| 2013/0039531 A1* | 2/2013 | Basso | G06F 3/017 382/103 |
| 2013/0042174 A1* | 2/2013 | Basso | G06Q 10/101 715/255 |
| 2013/0097682 A1* | 4/2013 | Zeljkovic | H04L 9/3231 726/7 |
| 2013/0262858 A1* | 10/2013 | Neuman | H04L 63/08 713/155 |
| 2013/0289994 A1* | 10/2013 | Newman | G10L 15/22 704/254 |
| 2013/0290136 A1* | 10/2013 | Sheets | G06Q 30/0609 705/26.35 |
| 2013/0325484 A1* | 12/2013 | Chakladar | G10L 15/26 704/275 |
| 2013/0339245 A1* | 12/2013 | Epstein | G06Q 20/40145 705/44 |
| 2014/0167931 A1* | 6/2014 | Lee | G08C 17/02 340/12.5 |
| 2015/0081495 A1* | 3/2015 | Randall | G06Q 40/02 705/35 |
| 2015/0113605 A1* | 4/2015 | Henderson | G06Q 50/01 726/4 |
| 2015/0128240 A1* | 5/2015 | Richards | H04L 63/0861 726/7 |
| 2015/0191152 A1* | 7/2015 | Gennermann | B60R 25/20 180/287 |
| 2015/0229756 A1* | 8/2015 | Raniere | H04W 12/06 455/411 |
| 2015/0257004 A1* | 9/2015 | Shanmugam | H04L 63/0853 455/411 |
| 2016/0050067 A1* | 2/2016 | Merchan | H04L 9/0838 713/171 |
| 2016/0057011 A1* | 2/2016 | Drope | G06F 17/30017 709/221 |
| 2016/0269176 A1* | 9/2016 | Pang | H04L 9/0841 |
| 2016/0301962 A1* | 10/2016 | Helms | G06F 21/10 |
| 2016/0329046 A1* | 11/2016 | Gross | G10L 15/22 |
| 2016/0342221 A1* | 11/2016 | Basso | G06F 3/005 |

\* cited by examiner

METHOD AND APPARATUS FOR VOICE ENROLLING AN ELECTRONIC COMPUTING DEVICE

FIELD OF THE DISCLOSURE

The present disclosure relates generally to enabling voice operation of an electronic computing device and more particularly to a server initiating voice enrollment of the electronic computing device over a communication connection.

BACKGROUND

As electronic computing devices evolve in their functionality and sophistication, voice becomes a more popular mode of operation. Voice provides a convenient way to interact with devices without having to navigate hierarchical menu structures or graphics objects presented on displays. To effectively use voice to control a device, the device is voice enrolled to recognize a user speaking a launch phrase. Training the device to recognize the launch phrase spoken by the user allows the device to respond to the user's voice commands without responding to or granting access to unauthorized persons.

Voice enrolling a device by the traditional means of speaking into a microphone of the device is complicated by a need to meet a variety of conditions. The environment in which the device is trained, for example, must oftentimes be relatively free of ambient noise. Further, the user must usually speak clearly, without speaking too loudly or too softly. In repeating a launch phrase during training, the user must in some instances exercise care to speak the launch phrase in the same way each time it is spoken. Some users have a tendency to speak to devices in a "robotic" voice rather than their natural speaking voice. Structural objects can also affect the voice enrollment of devices. If a device is on a tabletop or too close to a wall, for instance, reflected sound can create an acoustic echo that interferes with the proper voice training of the device.

BRIEF DESCRIPTION OF THE FIGURES

The accompanying figures, where like reference numbers refer to identical or functionally similar elements throughout the separate views, form part of the specification and illustrate embodiments in accordance with the included claims.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The method and device components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and apparatus for voice enrolling an electronic computing device. More specifically, a networked server sends voice data of a user over a communication connection to initiate voice enrollment of the electronic computing device. The voice enrollment of the electronic computing device, for example, voice enables a user-specific launch phrase for a voice-activated application programmed on the electronic computing device.

In accordance with the teachings herein, a method performed by a networked server includes receiving voice data over a first communication connection from a first electronic computing device. The voice data represents a user speaking a user-specific launch phrase. The method further includes receiving an indication of a second electronic computing device to voice enroll and initiating voice enrollment of the second electronic computing device over a second communication connection using the voice data.

Also in accordance with the teachings herein is a networked server configured to facilitate voice enrolling an electronic computing device. The networked server includes at least one communication interface configured to establish a first communication connection with a first electronic computing device and to establish a second communication connection with a second electronic computing device. The networked server additionally includes a processing element operatively coupled to the at least one communication interface. The processing element is configured to receive voice data over the first communication connection from the first electronic computing device, wherein the voice data represents a user-specific launch phrase spoken by a user. The processing element is further configured to receive an indication of the second electronic computing device to voice enroll and to initiate voice enrollment of the second electronic computing device over the second communication connection using the voice data.

In a first embodiment, the networked server further includes non-volatile storage operatively coupled to the processing element. The non-volatile storage is configured to store the voice data so the stored voice data is associated with the user.

In a second embodiment, the networked server further includes an audio encoding module operatively coupled to the processing element. The audio encoding module is configured to encode and/or transcode the voice data in accordance with one or both of a hardware characteristic or a software characteristic of the second electronic computing device.

In a third embodiment, the networked server further includes an audio configuration module operatively coupled to the processing element. The audio configuration module is configured to modify an acoustic characteristic of the voice data in accordance with a hardware difference and/or a software difference between the first electronic computing device and the second electronic computing device.

A networked server, also referred to simply as a server, is an electronic device connected to a communication network which allows the server to communicatively connect with a remotely located electronic computing device and to initiate voice enrollment of another electronic computing device. An electronic computing device, also referred to simply as a device, is any electronic device that can be voice enrolled and/or that can send an indication to a server of another device to voice enroll. Electronic computing devices include, but are not limited to, smartphones, tablets, phablets, laptops, home computers, personal digital assistants, enterprise digital assistants, gaming devices, portable media devices, streaming devices, smart televisions, and television interfacing devices.

Voice enrolling an electronic computing device means to voice enable a user-specific launch phrase, also referred to as a trigger phrase, on the device. When voice enrolled, for example, the device will take a programmed action in response to detecting a user speaking the launch phrase. In another embodiment, the device detecting the user speaking the launch phrase places the device in a mode to detect and/or process additional voice input. The device launches an application, for instance, upon detecting the launch phrase, whereby the application is configured for voice operation.

In different embodiments, the launch phrase includes one or more words spoken in one or more languages. The phrase "Achtung Smartphone" for instance, is a two-word launch phrase with the first word spoken in German and the second word spoken in English. In other embodiments, the launch phrase is made up partially or completely by uttered sounds or phonemes that do not represent defined words in any spoken language.

A user-specific launch phrase is a launch phrase that is individualized for a user. In a first embodiment, an electronic computing device recognizes a generic or default launch phrase when a user of the device speaks the generic launch phrase in his or her own voice. The device does not recognize the launch phrase when it is spoken by another person. In a second embodiment, the device recognizes a custom launch phrase created by the user. In a third embodiment, the device recognizes the custom launch phrase only if it is spoken by the user.

Figure 1:
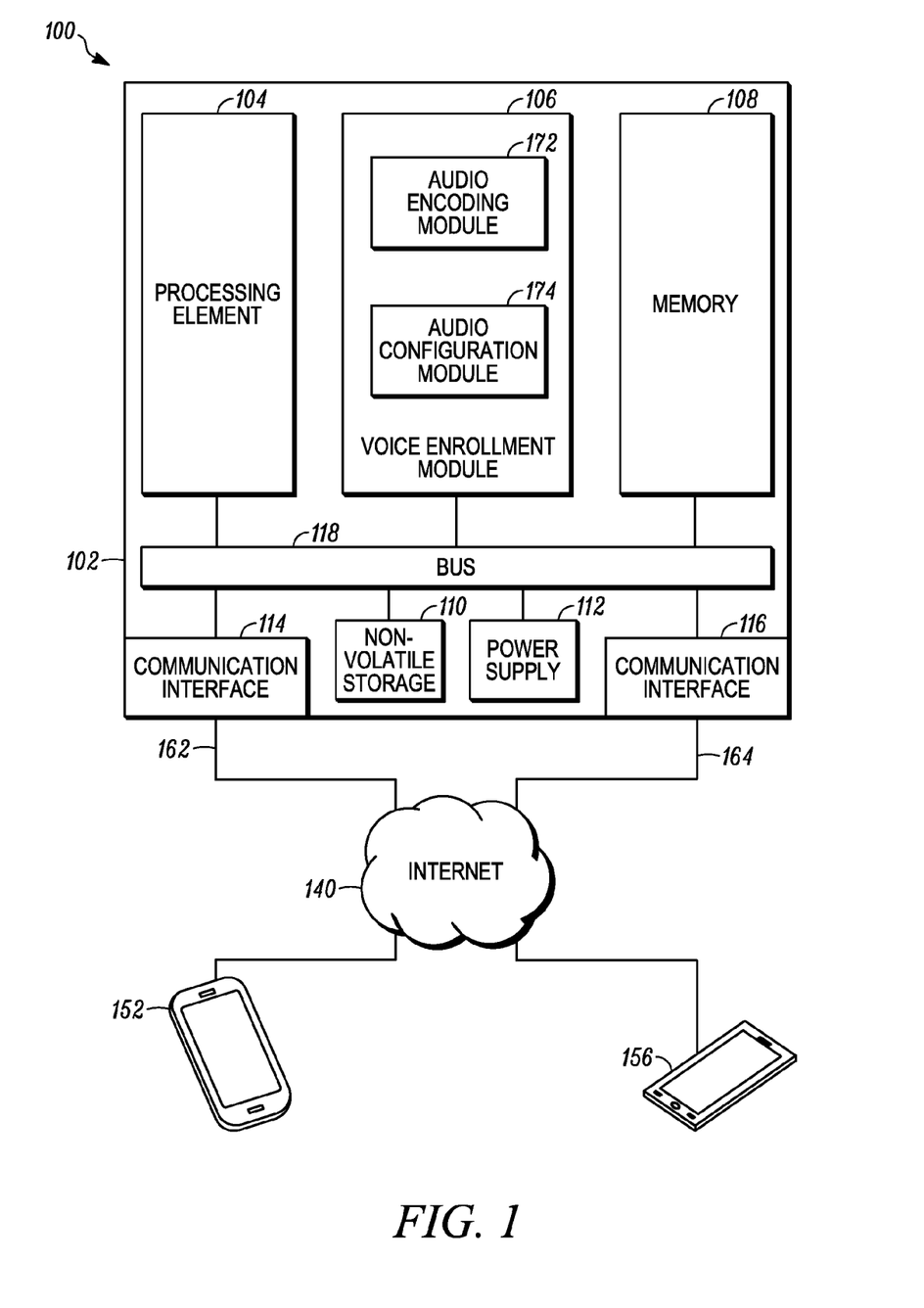
FIG. 1 shows a block diagram of a networked server with communication connections to two electronic computing devices.

FIG. 1 shows a block diagram 100 of a networked server 102, which is referred to in describing included embodiments. The server 102 is shown with a number of components, namely: a processing element 104; a voice enrollment module 106, which includes an audio encoding module 172 and an audio configuration module 174; memory 108; non-volatile storage 110; a power supply 112; and two communication interfaces 114, 116. A bus 118 operationally interconnects the components 104, 106, 108, 110, 112, 114, 116, 172, 174. The first communication interface 114 is shown supporting a first communication connection 162 communicatively coupling a first device 152 to the server 102 via the Internet 140. The second communication interface 116 is shown supporting a second communication connection 164 communicatively coupling a second device 156 to the server 102 via the Internet 140.

The components 104, 106, 108, 110, 112, 114, 116, 118, 172, 174 enable the server 102 to function in accordance with described embodiments. In other embodiments, servers having similar components are used to perform the functionality described herein with respect to the server 102. A limited number of device components 104, 106, 108, 110, 112, 114, 116, 118, 172, 174 are shown within the server 102 for ease of illustration. Other embodiments may include a lesser or greater number of components in the server 102. Another networked server, for example, may have a single communication interface that supports multiple communication connections for communicatively coupling with multiple devices. Moreover, other components needed for a commercial embodiment of a networked server that incorporates the components 104, 106, 108, 110, 112, 114, 116, 118, 172, 174 shown for the server 102 are omitted from FIG. 1 for clarity in describing the enclosed embodiments.

The processing element 104, for instance, includes arithmetic logic and control circuitry necessary to perform the digital processing, in whole or in part, for the server 102 to initiate voice enrollment of an electronic computing device in accordance with described embodiments. For one embodiment, the processing element 104 represents a primary microprocessor, also referred to as a central processing unit (CPU), of the server 102. For example, the processing element 104 can represent an application processor or an application-specific integrated circuit (ASIC). In another embodiment, the processing element 104 is an ancillary processor, separate from the CPU, wherein the ancillary processor is dedicated to providing the processing capability, in whole or in part, needed for the components 104, 106, 108, 110, 112, 114, 116, 118, 172, 174 of the server 102 to perform at least some of their intended functionality.

The memory 108 provides storage of electronic data used by the processing element 104 in performing its functionality. For example, the processing element 104 can use the memory 108 to load programs and/or store files associated with initiating voice enrollment of an electronic computing device. In one embodiment, the memory 108 represents random access memory (RAM). In other embodiments, the memory 108 represents cache memory.

The non-volatile storage 110 provides the server 102 with long-term storage for voice data, metadata, applications, and other types of data used by the server 102 in performing the methods described herein. Voice data received by the server 102, for instance, can be stored for a period of days or years when the processor 104 is not using the voice data or when the processor 104 is powered down. For particular embodiments, the server 102 uses magnetic (e.g., hard drive) and/or solid state (e.g., flash memory) storage devices. In an embodiment, a portion of the non-volatile storage 110 is removable. For example, the server 102 uses a micro secure digital (microSD) card to store data files associated with voice enrolling an electronic computing device.

The voice enrollment module (VEM) 106 includes hardware used by the server 102 while the processing element 104 is executing algorithms and/or programs directed to initiating the voice enrollment of an electronic computing device. Further, the VEM 106 may be co-located with the processing element 104, or implemented separately, as shown in FIG. 1.

In some embodiments, the VEM 106 changes an encoding characteristic of received voice data. In one instance, the VEM 106 includes hardware for encoding the voice data. In another instance, the VEM 106 includes hardware for transcoding the voice data. In both instances, for example, the encoding or transcoding is done using the audio encoding module 172.

In other embodiments, the VEM 106 changes an acoustic characteristic of the voice data. For instance, the VEM 106 includes signal processing hardware for altering the tonal, spectral, or spatial characteristics of the received voice data.

The signal processing hardware for one embodiment is included in the audio configuration module 174. Changing the encoding and/or acoustic characteristics of voice data is described in greater detail with respect to FIG. 2.

The communication interfaces 114, 116 allow for communication between the server 102 and other devices and/or servers, such as smartphones and/or a backend server, configured to interact with the server 102 as part of the server 102 performing its described functionality. For one embodiment, the communication interfaces 114, 116 include a cellular transceiver to enable the server 102 to communicatively couple with devices using one or more cellular networks. Cellular networks can use any wireless technology that, for example, enables broadband and Internet Protocol (IP) communications including, but not limited to: $3^{rd}$ Generation (3G) wireless technologies such as CDMA2000 and Universal Mobile Telecommunications System (UMTS) networks; $4^{th}$ Generation (4G) technologies such as LTE and WiMAX; or $5^{th}$ Generation (5G) technologies.

In another embodiment, the communication interfaces 114, 116 include a wireless local area network (WLAN) transceiver that allows the server 102 to access the Internet using standards such as Wi-Fi. The WLAN transceiver allows the server 102 to receive radio signals from similarly equipped electronic devices or a wireless access point (WAP), for instance, using a wireless distribution method, such as a spread-spectrum or orthogonal frequency-division multiplexing (OFDM) method. For some embodiments, the WLAN transceiver uses an IEEE 802.11 standard to communicate with other electronic devices in the 2.4, 3.6, 5, and 60 GHz frequency bands. In a particular embodiment, the WLAN transceiver uses Wi-Fi interoperability standards as specified by the Wi-Fi Alliance to communicate with other Wi-Fi certified devices.

For additional embodiments, the communication interfaces 114, 116 include hard-wired connections to a network infrastructure that allows the server 102 to communicate electronically with other communicatively enabled hardware, such as a backend server. For example, the communication interfaces 114, 116 include a socket that accepts an RJ45 modular connector which allows the server 102 to be connected directly to a network router by category-5 or category-6 Ethernet patch cable. The communication interfaces 114, 116 can also use a cable modem or a digital subscriber line (DSL) to connect to the Internet 140, and thereby to other devices, via an Internet service provider (ISP).

The power supply 112 represents a power source that supplies electric power to the device components 104, 106, 108, 110, 114, 116, 118, 172, 174 as needed, during the course of their normal operation. The power is supplied to meet the individual voltage and load requirements of the device components 104, 106, 108, 110, 114, 116, 118, 174, 176 that draw electric current. For some embodiments, the power supply 112 is a wired power supply that provides direct current from alternating current using a full- or half-wave rectifier. For other embodiments, the power supply 112 is a battery that powers up and runs the server 102 or provides primary or backup power for specific components. For a particular embodiment, the battery is a rechargeable power source. A rechargeable power source for a server is configured to be temporarily connected to another power source external to the server to restore a charge of the rechargeable power source when it is depleted or less than fully charged. In another embodiment, the battery is simply replaced when it no longer holds sufficient charge.

The first electronic computing device 152 represents a smartphone, which is referred to in describing some included embodiments. The smartphone 152, for example, is an older-model smartphone that a user is replacing with a newer-model smartphone shown as the second electronic computing device 156.

Figure 2:
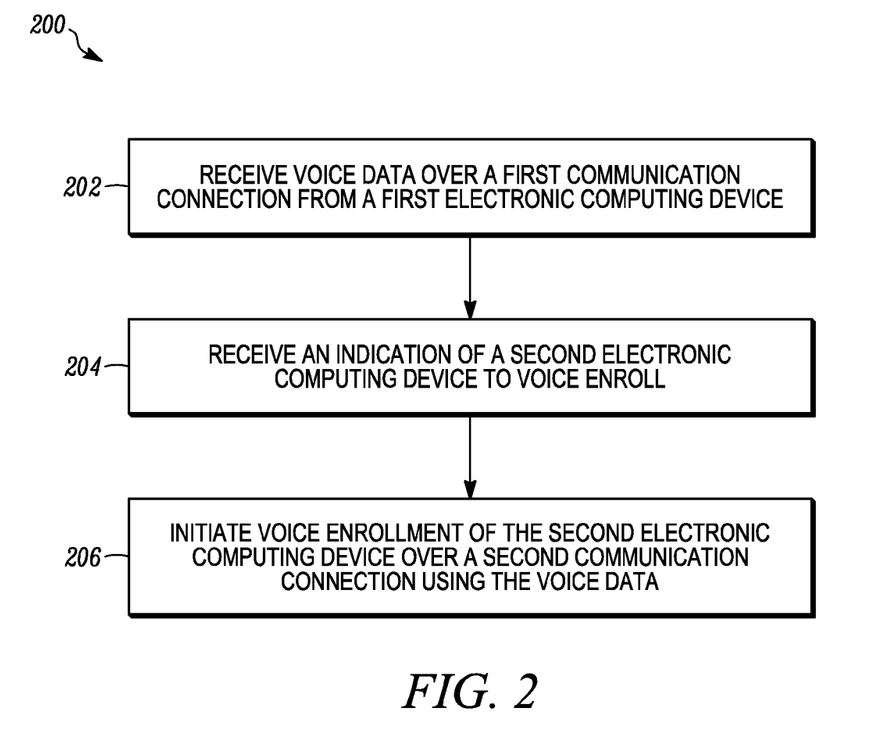
FIG. 2 shows a logical flow diagram illustrating a method for voice enrolling an electronic computing device.
Figure 4:
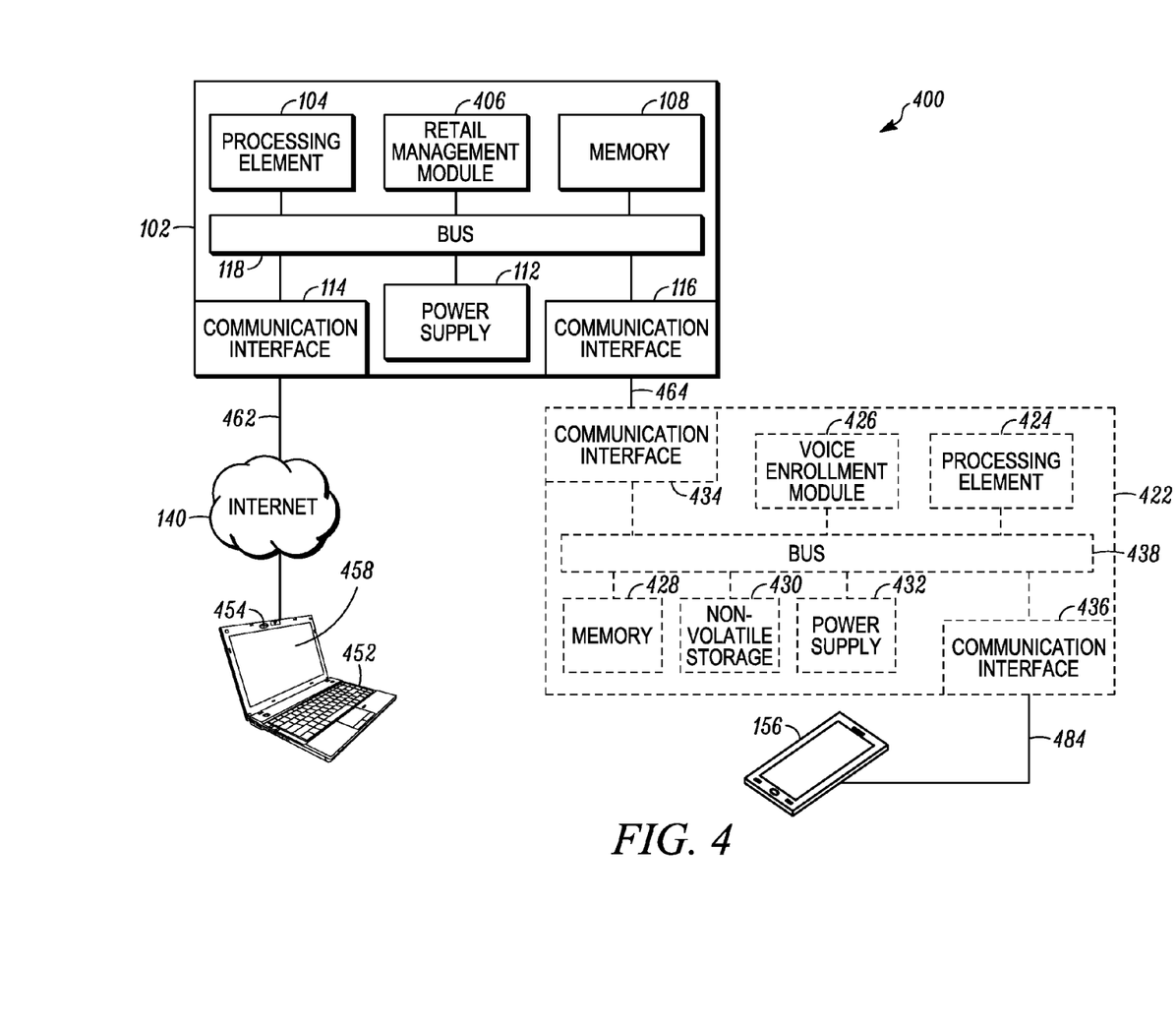
FIG. 4 shows a block diagram of a networked server included as part of a retail management system.

A detailed description of the functionality of the components shown in FIG. 1, and also of additional hardware shown in FIG. 4, is provided with reference to FIG. 2. FIG. 2 shows a logical flow diagram illustrating a method 200 performed by a networked server, taken to be the server 102, to initiate voice enrollment of a second electronic computing device, taken to be the smartphone 156.

The method 200 begins with the server 102 receiving voice data from the smartphone 152 over the communication connection 162. The voice data includes an electronic representation of a user of the smartphone 152 speaking a launch phrase used to voice enable the smartphone 152. After purchasing or otherwise receiving the smartphone 152, for example, the user voice enables the smartphone 152 by training the smartphone 152 manually to detect and accept the launch phrase. The user finds a quiet location, places the smartphone 152 in a learning mode for voice enablement, and speaks the trigger phrase when prompted by the smartphone 152 to do so. The smartphone 152 captures the spoken launch phrase as voice data and uses the voice data to configure itself for the launch phrase. The smartphone 152 also saves the voice data to internal memory or storage as one or more audio files.

At some time after being voice enabled, the smartphone 152 communicatively couples or connects with the server 102 using the communication connection 162. For instance, the smartphone 152 connects with the server 102 via the Internet 140 to register warrantee information or update software. A connection can refer to either a direct connection or an indirect connection unless specifically identified as one or the other. When connected with the server 102, the smartphone 152 sends the voice data to the server 102. For an embodiment, the server 102 receives the voice data from the smartphone 152 as a data file. Data files can include, but are not limited to, compressed, uncompressed, lossy, and/or lossless audio files such as MP3, WAV, FLAC, Ogg, or RAW files.

The server 102 receives 202 the voice data and stores it remotely from the smartphone 152 and remotely from the smartphone 156. In one embodiment, the server 102 stores the voice data to the non-volatile storage 110. In another embodiment, the server 102 stores the voice data to a storage device which is remote from the smartphone 152, from the smartphone 156, and from the server 102.

For an embodiment, the server 102 creates an account for the user of the smartphone 152 and associates the stored voice data with the account. This allows the server 102 to associate the voice data with the user, with the smartphone 152 belonging to the user, and/or with another device belonging to the user, such as the smartphone 156. Two years after purchasing the smartphone 152, for example, the user replaces it with the smartphone 156. When the user uses his smartphone 156 to connect with the server 102 and log into his account, the server 102 identifies the smartphone 156 and associates the smartphone 156 with the user and/or the account.

The method 200 continues with the server 102 receiving 204 an indication of a second device to voice enroll, which in described embodiments is the smartphone 156. For one embodiment, the server 102 receiving 204 the indication of the smartphone 156 to voice enroll includes the server 102 receiving data that allows the server 102 to identify the model and/or the hardware configuration of the smartphone 156. For another embodiment, the server 102 receiving 204 the indication of the smartphone 156 to voice enroll includes the server 102 receiving an indication directing the server 102 to initiate voice enrollment of the smartphone 156.

In performing the method 200, the server 102 also uses the voice data received from the smartphone 152 to initiate 206 voice enrollment of the smartphone 156 over the communication connection 164 with the smartphone 156. FIG. 1 shows the smartphone 152 and the smartphone 156 being connected to the server 102 together. In other embodiments, the smartphone 152 and the smartphone 156 are connected to the server 102 at different times. On Nov. 28, 2014, for example, the smartphone 152 connects with the server 102. The server 102 receives 202 the voce data from the smartphone 152 and stores the voice data with an association to an account belonging to the user of the smartphone 152. If such an account is not preexisting, it is created using information provided by the user. On Jul. 12, 2016, the user uses his new smartphone 156 to connect with the server 102 and log into his account. After receiving 204 an indication from the smartphone 156 to voice enroll the smartphone 156, the server 102 uses the stored voice data received from the smartphone 152 to initiate 206 voice enrollment of the smartphone 156.

In another embodiment, the user establishes simultaneous connections to the server 102 from his old smartphone 152 and from his new smartphone 156. Upon receiving 204 an indication from either the smartphone 152 or the smartphone 156 to voice enroll smartphone 156, the server 102 initiates 206 voice enrollment of the smartphone 156 using the voice data the server 102 receives 202 from the smartphone 152. For some embodiments, the server 102 receives 202 the voice data from the smartphone 152 and sends the voice data to the smartphone 156 while both the smartphone 152 and the smartphone 156 are simultaneously connected to the server 102. More detailed embodiments describing the method 200 are provided with reference to the remaining figures.

Figure 3:
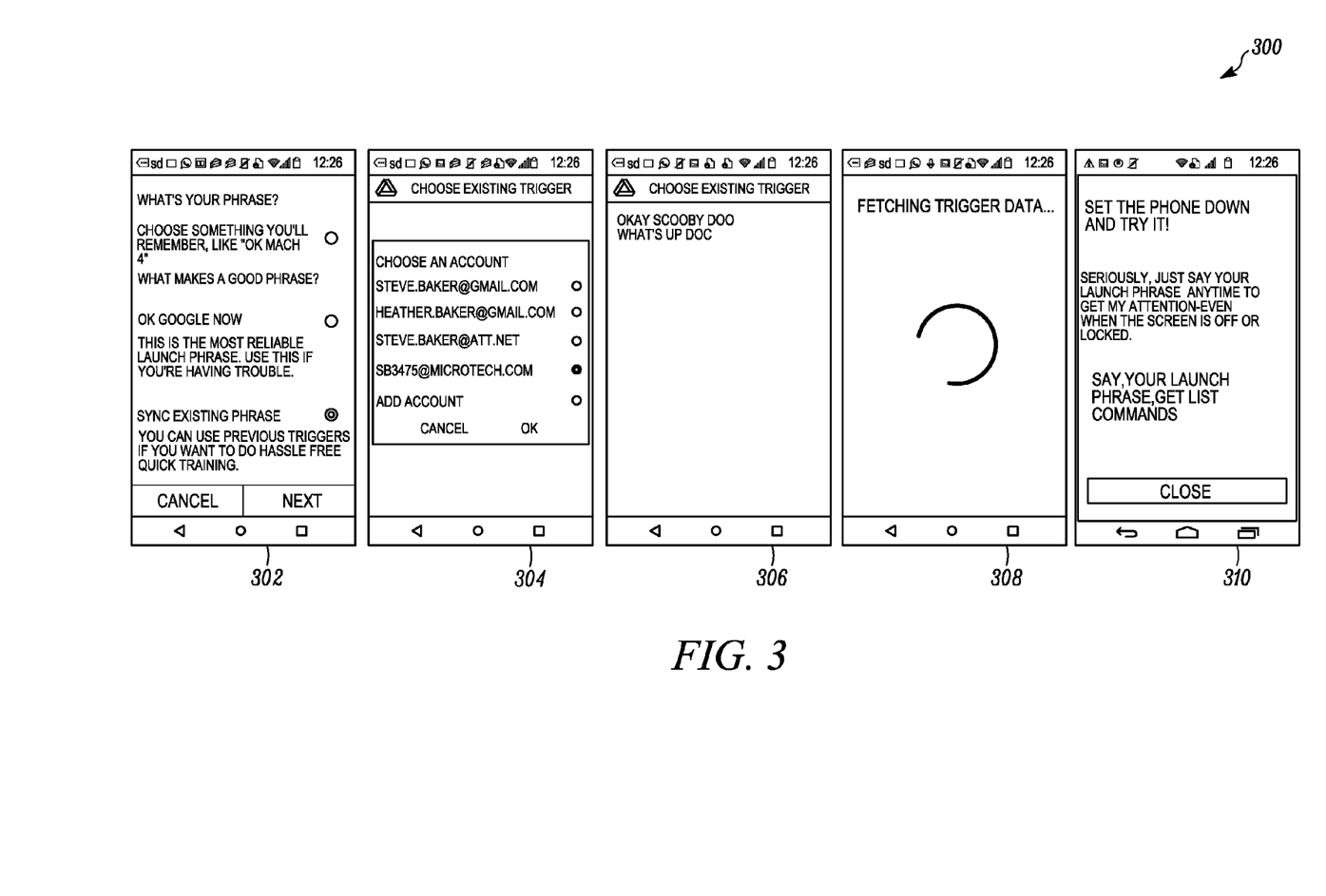
FIG. 3 shows a series of screen captures for an electronic computing device being voice enrolled.

FIG. 3 shows a series 300 of screen captures 302, 304, 306, 308, 310, also referred to as screens, of a display of the smartphone 156 as the smartphone 156 is being voice enrolled. With the screen 302, the smartphone 156 presents its user with the option of having the server 102 initiate voice enrollment the smartphone 156. This makes voice enrolling the smartphone 156 manually by speaking a launch phrase unnecessary. The user instead selects an option of synchronizing the smartphone 156 with an existing launch phrase stored on the server 102 as voice data. Selecting this option establishes a communication connection with the server 102 and provides the indication to the server 102 that the server 102 is to initiate voice enrollment of the smartphone 156.

The screen 304 identifies accounts with which the server 102 has associated voice data for previously used launch phrases. For some embodiments, a user may have more than one account. Additionally, the smartphone 156 may have more than one user. The smartphone 156, for example, is owned by the user Steve Baker. Steve's wife, Heather Baker, who prefers to use her own launch phrase, is also an authorized user of the smartphone 156.

From the screen 304, Heather selects her account, "heather.baker@gmail.com," with which the server 102 has associated stored voice data for two of her previously used launch phrases: "Okay Scooby Doo" and "What's up doc." The smartphone 156 presents Heather with the screen 306, which allows Heather to select one of the two launch phrases. Heather taps on the launch phrase "Okay Scooby Doo," and the smartphone 156 communicates her selection to the server 102. The server 102 responsively initiates 206 voice enrollment of the smartphone 156. The screen 308 presents a notification that the smartphone 156 is being voice enrolled. Upon finishing the voice enrollment, the smartphone 156 presents heather with the screen 310, which provides a notification that the voice enrollment is complete and also provides an option for testing that the voice enrollment was performed successfully.

In some embodiments, the server 102 initiating 206 voice enrollment of the smartphone 156 includes the server 102 sending the voice data for the launch phrase over the communication connection 164 to smartphone 156. The smartphone 156 receives the voice data and uses the voice data to configure itself to detect the user speaking the launch phrase. For one embodiment, the smartphone 156 configuring itself to detect the user speaking the launch phrase includes the smartphone 156 training itself for speech recognition that involves speaker identification. The smartphone 156 trains itself using the voice data received from the server 102 the same way it would train itself using voice data received directly from the user via a microphone if the user were voice enrolling the smartphone 156 manually. For example, the smartphone 156 processes the voice data to create a voice model file that allows the smartphone to use a statistically-based speech recognition algorithm. The smartphone 156 uses a hidden Markov model (HMM), for instance, and approximates speech signals as piecewise stationary signals or short-time stationary signals on a brief time period, such as 10 milliseconds.

In other embodiments, the server 102 initiating 206 voice enrollment of the smartphone 156 includes the server 102 generating, using the voice data, a voice model for the smartphone 156. After generating the voice model, the server 102 sends the voice model over the communication connection 164 to smartphone 156. The voice model configures the smartphone 156 to detect the user speaking the launch phrase. Rather than sending the voice data to the smartphone 156 and having the smartphone 156 create a voice model file for use with a particular speech recognition algorithm, the server 102 generates the voice model file and sends it to the smartphone 156. In different embodiments, different voice models are generated, depending upon the configuration of the smartphone 156 and which speech recognition algorithm the smartphone 156 is implementing. For a particular embodiment, the server 102 receives from the smartphone 156, when the smartphone 156 is communicatively coupled to the server 102, an indication of which speech recognition algorithm the smartphone 156 is implementing.

For a number of embodiments, the voice data the server 102 receives from the smartphone 152 includes metadata. The metadata, for example, includes a capturing characteristic and/or an encoding characteristic of the user-specific launch phrase represented by the voice data.

In several embodiments, the server 102 uses the metadata to process or alter the voice data it receives from the smartphone 152 before sending the voice data to the smartphone 156. The server 102 processes the voice data in accordance with a hardware and/or a software characteristic of the smartphone 156. This is to adapt the voice data for more efficient or seamless use by the smartphone 156, which can have a different hardware and/or software configuration from the smartphone 152. A hardware characteristic of a device is a type of hardware or a hardware setting on the device that affects a quality, property, or encoding of speech captured by the device. A dynamic microphone or a condenser microphone, for instance, is a hardware characteristic that affects the quality and property of captured sound.

A software characteristic of a device is a type of software or a software setting on the device that affects a quality, property, or encoding of speech captured by the device. A noise reduction algorithm or an equalization algorithm, for instance, is a software characteristic that affects the quality and property of captured sound.

In one embodiment, the server 102 processing the voice data includes the server 102 transcoding voice data from a first encoded format to a second encoded format. For instance, the smartphone 152 is configured to encode voice data using the proprietary MP3 format, whereas the smartphone 156 is configured to use voice data encoded in the open-source Ogg format. The server 102 receives the voice data from the smartphone 152, transcodes the voice data from the MP3 format to the Ogg format using the audio encoding module 172, and then sends the voice data to the smartphone 156.

In another embodiment, the smartphone 152 uses a modulation, such as pulse-code modulation (PCM), to digitally represent analog voice data. For example, the smartphone 152 digitizes the voice data with a sampling rate of 16 kilohertz (kHz) and a bit depth of 16 bits before sending the digital voice data to the server 102. The smartphone 156, however, is configured to perform voice enrollment with digital voice samples having a sampling rate of 32 kHz and a bit depth of 24 bits. The server 102 processes the digital voice data it receives from the smartphone 152 to simulate having a sampling rate of 32 kHz and a bit depth of 24 bits before sending the processed voice data to the smartphone 156 to initiate voice enrollment.

For a different embodiment, the server 102 processing the voice data includes the server 102 modifying an acoustic property of the voice data from having a first acoustic characteristic to having a second acoustic characteristic. An acoustic property is an aspect of voice data affecting how the voice data sounds and an acoustic characteristic is a quantifiable value or describable feature relating to an acoustic property. Ideally, the voice data the smartphone 156 receives from the server 102 for voice enrollment will sound the same as when the smartphone 156 captures the user speaking the launch phrase. In reality, however, the voice data that the smartphone 152 captures will have different acoustic characteristics from the speech the smartphone 156 captures. This results from the smartphone 156 having a different hardware and/or software configuration from the smartphone 152.

The smartphone 152, for example, uses a single middle-quality monaural microphone of a particular brand to capture voice data. The newer smartphone 156 uses two high-quality stereo microphones of a different brand to capture the user speaking the launch phrase. Under controlled conditions, technicians compare the tonal characteristic of speech captured from a same model smartphone as the smartphone 152 to the tonal characteristic of speech captured from a same model smartphone as the smartphone 156. The technicians conclude from their analysis that speech captured by the model smartphone 152 has a lower pitch as compared to a more balanced frequency response of speech captured by the model smartphone 156. Based on this finding, the technicians determine an amount of equalization to apply to the speech samples captured by the model smartphone 152 to make them sound more like the speech samples captured by the model smartphone 156. The technicians also empirically determine modification parameters for other acoustic properties so that when a set of modification parameters is applied to voice data captured by the smartphone 152, it sounds similar to speech captured by the smartphone 156 using its own hardware.

For some embodiments, the server 102 determines a model for the smartphone 152. In a first embodiment, the server 102 receives an indication of the model of the smartphone 152 when the smartphone 152 is communicatively coupled to the server 102 and the server 102 is receiving 202 the voice data. In a second embodiment, when the smartphone 152 is communicatively coupled to the server 102, the indication the server 102 receives 204 to voice enroll the smartphone 156 includes an indication of the model of the smartphone 152. In a third embodiment, the user logs into his account on the server 102 from another device, such as a home computer, and provides the server 102 with an indication of the model of the smartphone 152 for which the server 102 has voice data stored.

Based on the model of the smartphone 152 and the model of the smartphone 156, the server 102 applies a specific set of modification parameters to the voice data it receives from the smartphone 152 before sending the voice data to the smartphone 156. To apply the set of modification parameters to the voice data, for example, the server 102 uses the audio configuration module 174. Applying the set of modification parameters to voice enroll the smartphone 156 results in the smartphone 156 having better accuracy in determining when the user is speaking the launch phrase.

For another embodiment, after the server 102 initiates 206 and the smartphone 156 completes voice enrollment, the smartphone 156 continues to train itself using speech captured by its own hardware to further improve its accuracy in determining when the user is speaking the launch phrase. The smartphone 156, for example, captures multiple samples of the user speaking the launch phrase after its voice enrollment. Of the multiple samples, the smartphone 156 determines which samples have the lowest noise and/or which samples are most characteristic of the user's average speaking voice. The smartphone 156 then utilizes these samples to "fine tune" its voice enrollment by making modifications to a voice model the smartphone 156 uses for speech recognition.

FIG. 4 shows a block diagram of the networked server 102 as part of a retail management system 400. For some embodiments, a user can connect with the server 102 using an electronic computing device to place an order for another electronic computing device. Specifically, FIG. 4 shows the server 102 connected by a communication connection 462 to a laptop 452 via the Internet 140. Additionally, the server 102 includes a retail management module (RMM) 406. The RMM 406 includes hardware used by the server 102 while the processing element 104 is executing algorithms and/or programs directed to taking orders over a network connection for electronic computing devices configured to support voice enrollment.

The laptop 452, which includes a microphone 454 and a display 458, is used to order the smartphone 156 online. FIG. 4 also shows a configuring apparatus 422 which is communicatively coupled between the server 102 and the smartphone 156 for an embodiment. The configuring apparatus 422 is communicatively coupled to the server 102 by a communication connection 464 and to the smartphone 156 by a communication connection 484. For other embodiments from which the configuring apparatus 422 is absent, as indicated by the broken lines, the communication connection 484 becomes part of the communication connection 464, which is referred to as the communication connection 464/484.

Figure 5:
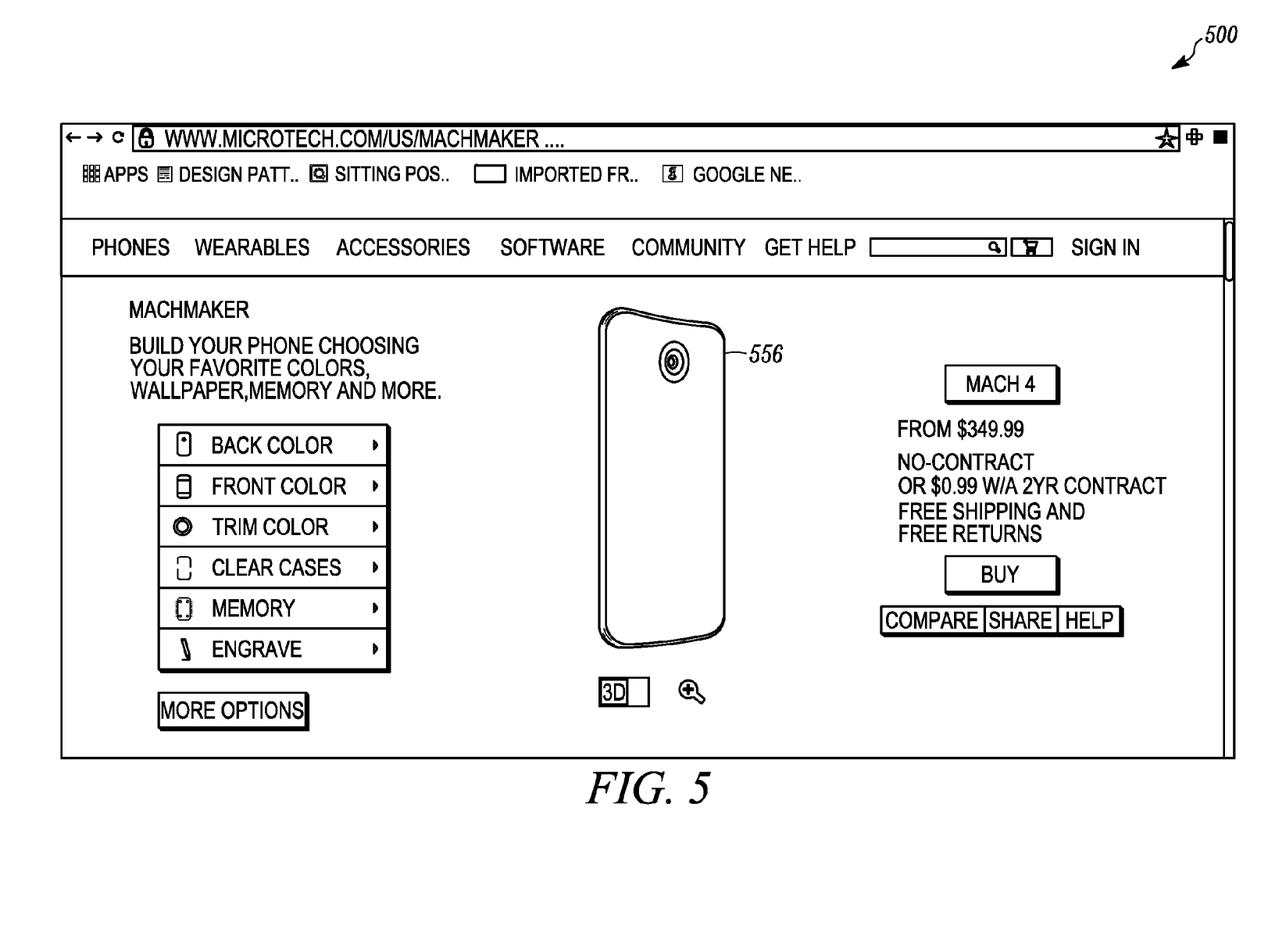
FIG. 5 shows a screen capture for an electronic computing device communicatively connected to a networked server included as part of a retail management system.

Using the laptop 452 in place of the smartphone 152 for particular embodiments, the user enters a uniform resource locater (URL) for a retail website into a web browser executing on the laptop 452. The retail website allows the user to order a newly released Mach-4 smartphone, indicated in FIG. 4 as the smartphone 156. The laptop 452 connects with the server 102, allowing the user to browse the website. The user navigates to a "machmaker" webpage 500, shown in FIG. 5, which allows the user to customize the base model Mach-4 smartphone displayed on the webpage 500 at 556. From a list of options, the user can choose a color combination for his new smartphone 156 in addition to specifying an amount of memory. Through the website the user can also choose to have his Mach-4 smartphone 156 voice enrolled before being shipped.

When server 102 receives the order for the smartphone 156, for example, the server 102 sends an invitation to the laptop 452 over the communication connection 462 for the user to have the smartphone 156 voice enrolled prior to delivery. For an embodiment, the invitation is accompanied by a request for voice data. In providing the voice data, the user is guided by a series of prompts appearing on the display 458. Following the prompts, the user speaks a desired launch phrase a specified number of times or until a satisfactory sample of the user speaking the launch phrase is captured as voice data.

The laptop 452 sends the voice data to the server 102 over the communication connection 462. For one embodiment, the laptop 452 encodes the voice data into an audio file before sending the voice data to the server 102. In another embodiment, the laptop 452 streams the voice data to the server 102 so that the server 102 continuously receives 202 the voice data as the user speaks the launch phrase into the microphone 454. For an alternate embodiment, the order for the smartphone 156 is placed from another electronic computing device, such as the smartphone 152, which itself is voice enrolled, allowing the device to send previously captured voice data to the server 102. Upon receiving 202 the streamed voice data, the server 102 encodes the voice data and stores it to the non-volatile storage 110 until the server 102 is ready to initiate voice enrollment of the smartphone 156.

After the customized smartphone 156 is assembled, it is connected to the server 102 by the communication connection 464/484. Using a near field connection (NFC), a Wi-Fi connection, or a wireline connection, for example, the server 102 initiates 206 voice enrollment of the smartphone 156. When voice enrollment of the smartphone 156 is completed, the smartphone 156 is packaged and delivered to the user.

For embodiments which include the configuring apparatus 422, the server 102 initiating 206 voice enrollment of the smartphone 156 includes the server 102 sending the voice data it received from the laptop 452 over the communication connection 464 to the configuring apparatus 422. The configuring apparatus 422 then uses the voice data to configure the smartphone 156 to detect the user speaking the launch phrase. For this purpose, the configuring apparatus 422 is shown with a VEM 426. The configuring apparatus 422 is also shown to have a processing element 424, memory 428, non-volatile storage 430, two communication interfaces 434, 436, and a power supply 432, all operatively interconnected by a bus 438. In some embodiments, the server 102 is a frontend or client-side server providing retail services while the configuring apparatus 422 is a backend server providing processing and management capability to facilitate voice enrolling electronic computing devices.

For particular embodiments, the server 102 operates as a web server to accept an order for the smartphone 156 placed from the laptop 452. The order specifies that the smartphone 156 is to be voice enrolled and the server 102 receives 202 voice data from the laptop 458. The server 102 initiates 206 voice enrollment of the smartphone 156 by sending the voice data to the configuring apparatus 422 via the communication connection 464. In some instances, the configuring apparatus 422 stores the voice data to the non-volatile storage 430 in connection with an account associated with the user's order for the smartphone 156.

For one embodiment, the server 102 and the configuring apparatus 422 are located in close proximity to one another. When the server 102 and the configuring apparatus 422 are located within the same room or building, for example, the communication connection 464 is an NFC connection, a Wi-Fi connection, or a wireline connection connecting the communication interface 116 to the communication interface 434. When the server 102 and the configuring apparatus 422 are located remotely from one another, the communication connection 464 is a network connection that sends data across a public or shared network. For example, the communication connection 464 is a virtual private network (VPN) connection that extends across the Internet 140.

After the customized smartphone 156 is assembled, it is connected to the configuring apparatus 422 by the communication connection 484. Using an NFC connection, a Wi-Fi connection, or a wireline connection, for example, the configuring apparatus 422 continues the voice enrollment of the smartphone 156 initiated by the server 102. When voice enrollment of the smartphone 156 is completed, the smartphone 156 is packaged and delivered to the user.

In different embodiments, a device-to-device voice enrollment procedure allows the smartphone 152 to initiate voice enrollment of the smartphone 156 without using the server 102 or the configuring apparatus 422. A user, for example, places both the smartphones 152, 156 in a device-to-device voice enrollment mode, designating through user input the smartphone 152 as the initiating device and the smartphone 156 as the receiving device. The smartphones 152, 156 communicatively link with one another, using a WiFi Direct, a Bluetooth, or an NFC connection, for instance. The user might input an authentication code on each smartphone 152, 156 for some embodiments as a security measure to provide confirmation that the user is in control of both devices. In other embodiments, a security measure is intrinsic to a particular communication protocol used. The smartphone 152 then sends stored voice data to the smartphone 156. After receiving the voice data, the smartphone 156 completes the voice enrollment process using the voice data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a networked server, the method for transferring a voice enrollment of a first electronic computing device for use by a user to a second electronic device for use by the same user to make voice enrolling the second electronic device by directly speaking to the device unnecessary, the method comprising:
   receiving voice data over a first communication connection from the first electronic computing device, wherein the voice data comprises a user-specific launch phrase spoken by the user, wherein the user-specific launch phrase spoken to the first electronic computing device is configured for training the first electronic computing device to launch in response to the user-specific launch phrase spoken by voice of the user, and wherein the voice data comprising the user-specific launch phrase is transmitted from the first electronic computing device to the server;
   creating an account for the user and associating the voice data with the account of the user;
   receiving an indication of a second electronic computing device to voice enroll, wherein the indication is a trigger event indicating that the second electronic computing device is to be associated with the user; and
   initiating voice enrollment of the second electronic computing device over a second communication connection by sending the voice data to the second electronic computing device for use by the user for launching the second electronic computing device by speaking the launch phrase, wherein the second electronic computing device is synchronized with the voice data received from the server and associated with the user, wherein the networked server comprises a portion of a retail management system, and wherein receiving an indication of the second electronic computing device comprises receiving an order for the second electronic computing device placed from the first electronic computing device.

2. The method of claim 1, wherein the voice enrollment of the second electronic computing device comprises voice enabling the user-specific launch phrase for a voice-activated application programmed on the second electronic computing device.

3. The method of claim 1 further comprising sending over the first communication connection to the first electronic computing device an invitation for the user to elect to have the second electronic computing device voice enrolled prior to delivery, wherein the invitation comprises a request for the voice data.

4. The method of claim 1, wherein the networked server receives the voice data from the first electronic computing device as a data stream.

5. The method of claim 4, further comprising encoding the voice data.

6. The method of claim 1, wherein the networked server receives the voice data from the first electronic computing device as a data file.

7. The method of claim 1, further comprising storing the voice data remotely from the first electronic computing device and the second electronic computing device.

8. The method of claim 1, wherein the voice data comprises metadata specifying one or both of a capturing characteristic or an encoding characteristic of the user-specific launch phrase included in the voice data.

9. The method of claim 8 further comprising processing the voice data, using the metadata, in accordance with one or both of a hardware characteristic or a software characteristic of the second electronic computing device.

10. The method of claim 9, wherein processing the voice data comprises transcoding the voice data from a first encoded format to a second encoded format.

11. The method of claim 9, wherein processing the voice data comprises modifying an acoustic property of the voice data from having a first acoustic characteristic to having a second acoustic characteristic.

12. The method of claim 1, wherein initiating voice enrollment of the second electronic computing device comprises sending the voice data over the second communication connection to the second electronic computing device, wherein the second electronic computing device is configured to use the voice data to configure itself to detect the user speaking the user-specific launch phrase.

13. The method of claim 1, wherein initiating voice enrollment of the second electronic computing device comprises:
  generating, using the voice data, a voice model for the second electronic computing device; and
  sending the voice model over the second communication connection to the second electronic computing device, wherein the voice model configures the second electronic computing device to detect the user speaking the user-specific launch phrase.

14. The method of claim 1, wherein initiating voice enrollment of the second electronic computing device comprises sending the voice data over the second communication connection to a configuring apparatus to use the voice data to configure the second electronic computing device to detect the user speaking the user-specific launch phrase.

15. The method of claim 1, wherein the first electronic computing device and the second electronic computing device are smartphone devices.

16. A networked server comprising:
  at least one communication interface configured to establish a first communication connection with a first electronic computing device and to establish a second communication connection with a second electronic computing device; and
  a processing element operatively coupled to the at least one communication interface, wherein the processing element is configured to:
    receive voice data over the first communication connection from the first electronic computing device, wherein the voice data comprises a user-specific launch phrase spoken by a user, wherein the user-specific launch phrase spoken to the first electronic computing device is configured for training the first electronic computing device to launch in response to the user-specific launch phrase spoken by voice of the user, and wherein the voice data comprising the user-specific launch phrase is transmitted from the first electronic computing device to the server;
    create an account for the user and associate the voice data with the account of the user;
    receive an indication of the second electronic computing device to voice enroll, wherein the indication is a trigger event indicating that the second electronic computing device is to be associated with the user; and
    initiate voice enrollment of the second electronic computing device over the second communication connection by sending the voice data to the second electronic computing device for use by the user for launching the second electronic computing device by speaking the launch phrase, wherein the second electronic computing device is synchronized with the voice data received from the server and associated with the user, wherein the networked server comprises a portion of a retail management system, and wherein receiving an indication of the second electronic computing device comprises receiving an order for the second electronic computing device placed from the first electronic computing device.

17. The networked server of claim 16 further comprising a non-volatile storage operatively coupled to the processing element, wherein the non-volatile storage is configured to store the voice data, wherein the stored voice data is associated with the user.

18. The networked server of claim 16 further comprising an audio encoding module, implemented at least in part in hardware, operatively coupled to the processing element, wherein the audio encoding module is configured to one or both of encode or transcode the voice data in accordance with one or both of a hardware characteristic or a software characteristic of the second electronic computing device.

19. The networked server of claim 16 further comprising an audio configuration module, implemented at least in part in hardware, operatively coupled to the processing element, wherein the audio configuration module is configured to modify an acoustic characteristic of the voice data in accordance with one or both of a hardware difference or a software difference between the first electronic computing device and the second electronic computing device.

20. The networked server of claim 16, wherein the first electronic computing device and the second electronic computing device are smartphone devices.

* * * * *